United States Patent [19]

Kanda

[11] Patent Number: 5,894,375
[45] Date of Patent: Apr. 13, 1999

[54] MAGNETIC DISK APPARATUS AND METHOD THAT REVERSES SENSE CURRENT IN MAGNETORESISTIVE HEAD

[75] Inventor: Eiichi Kanda, Kawasaki, Japan

[73] Assignee: Fujitsu Limited, Kawasaki, Japan

[21] Appl. No.: 08/617,692

[22] Filed: Mar. 19, 1996

[30] Foreign Application Priority Data

Jun. 6, 1995 [JP] Japan .................... 7-138998

[51] Int. Cl.$^6$ .................................. G11B 5/596
[52] U.S. Cl. ........................ 360/77.02; 360/77.04; 360/75
[58] Field of Search ............... 360/77.04, 113, 360/66, 46, 67, 77.02, 77.08, 75

[56] References Cited

U.S. PATENT DOCUMENTS

| | | | |
|---|---|---|---|
| 4,841,398 | 6/1989 | Mowry | 360/113 |
| 5,367,411 | 11/1994 | Nishiyama et al. | 360/66 |
| 5,436,773 | 7/1995 | Hanson | 360/66 |
| 5,444,589 | 8/1995 | Hu et al. | 360/113 |
| 5,719,719 | 2/1998 | Tsuyoshi et al. | 360/66 |

FOREIGN PATENT DOCUMENTS

| | | |
|---|---|---|
| 60-234213 | 11/1985 | Japan . |
| 63-117310 | 5/1988 | Japan . |
| 04003305 | 1/1992 | Japan . |
| 06203331 | 7/1994 | Japan . |

*Primary Examiner*—Aristotelis M. Psitos
*Assistant Examiner*—James L. Habermehl
*Attorney, Agent, or Firm*—Greer, Burns & Crain, Ltd.

[57] ABSTRACT

Recording signals can be reproduced without needing a deviation of a recording magnetic pole and a magneto-resistive element in a track width direction and without causing an off-track in a whole region from the inner side to the outer side. A sense current supplying circuit which supplies a predetermined sense current to the magneto-resistive element and can switch the direction of the sense current is provided. By control means such as an MPU or the like, the direction of the sense current by the sense current supplying circuit is switched in accordance with a cylinder position of a combination head, thereby magnetically changing the center position of a reproducing sensitivity of the magneto-resistive element in a track width direction. The combination head has a structure such that a geometrical center position of the magneto-resistive element in a read head and a geometrical center position of a recording magnetic pole in a write head are made to coincide in the track direction.

17 Claims, 16 Drawing Sheets

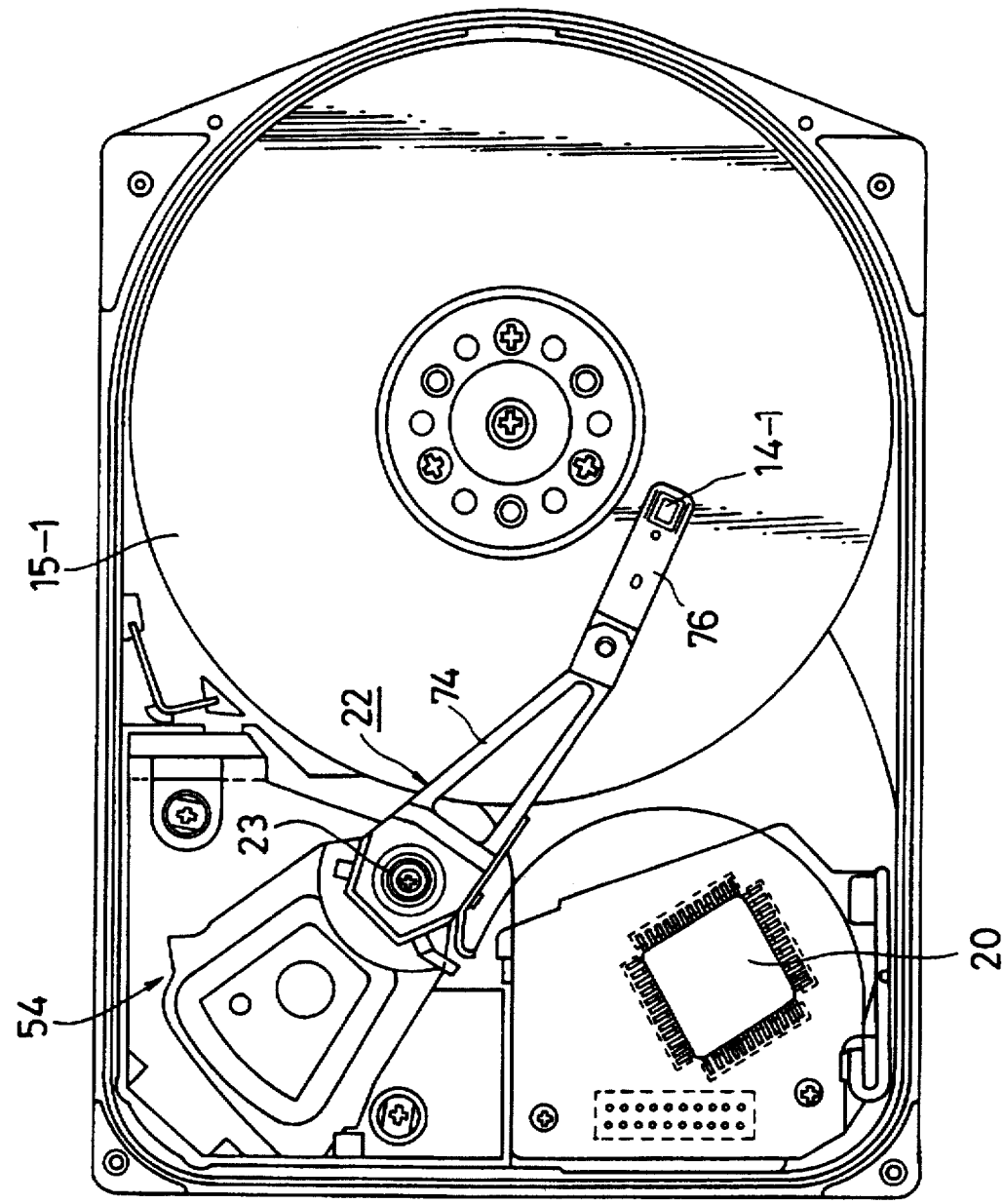

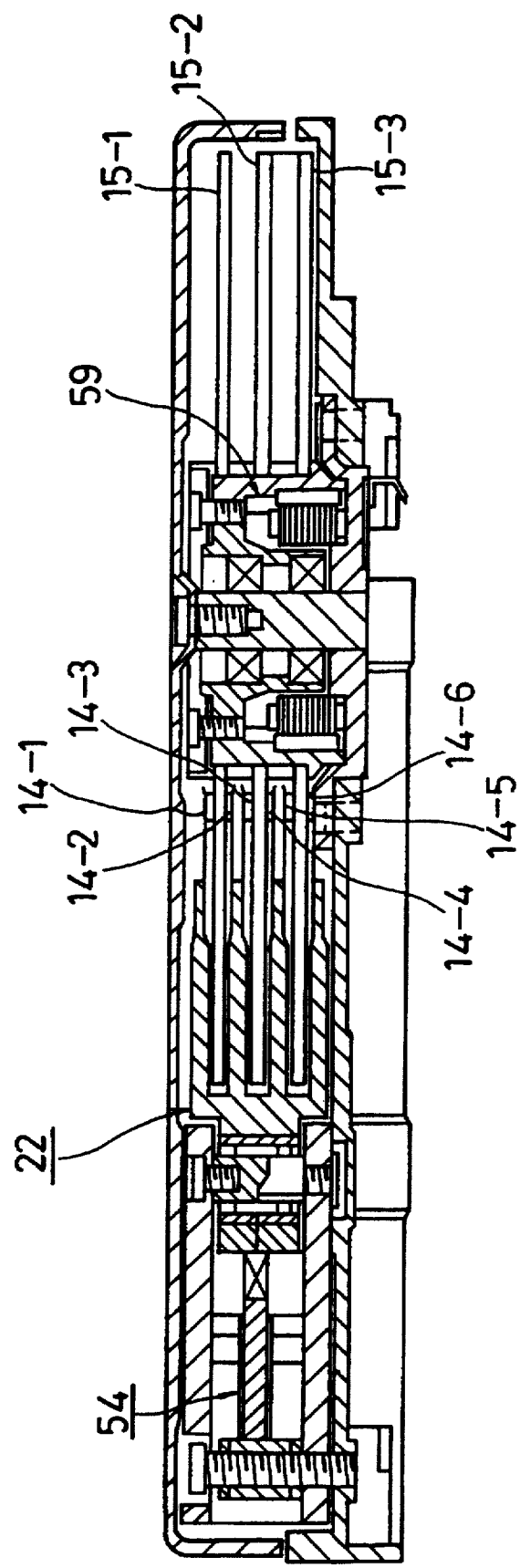

FIG. 17

| | UP-HEAD | DOWN-HEAD |
|---|---|---|
| INNER TRACK | REVERSE DIRECTION | FORWARD DIRECTION |
| OUTER TRACK | FORWARD DIRECTION | REVERSE DIRECTION |

MAGNETIC DISK APPARATUS AND METHOD THAT REVERSES SENSE CURRENT IN MAGNETORESISTIVE HEAD

BACKGROUND OF THE INVENTION

The invention relates to a magnetic disk apparatus using a magneto-resistive element as a read head and to a reproducing method of the magnetic disk apparatus. More particularly, the invention relates to a magnetic disk apparatus using a combination head integratedly comprising a read head using a magneto-resistive element and a write head using an inductive head and to a reproducing method of the magnetic disk apparatus.

In recent years, in association with a large capacity of a magnetic disk apparatus as an external memory apparatus of a computer, a magnetic head of a high performance is required. As an apparatus which satisfies such a requirement, attention is paid to a magnetic disk apparatus having what is called an MR (magneto-resistive) head using a magneto-resistive element which does not depend on a peripheral velocity of a recording medium and which can obtain a high reproduction output.

Hitherto, in a magnetic disk apparatus having a swing type positioning mechanism to which an MR head is attached, as shown in FIG. 1, by rotating a rotary positioner 22 by a voice coil motor, an arm 74 is swung and a magnetic head 14 is positioned. FIG. 2 is a diagram enlargedly showing a conventional magnetic head. The magnetic head 14 is provided at an edge surface of a slider 88 which is supported at a tip of the arm. As shown in FIG. 3, the magnetic head 14 is constructed by an inductive head and an MR head. The inductive head is constructed by an upper magnetic pole 76, a coil 78, and a lower magnetic pole 80 and performs a magnetic recording of a recording track 75 having a width of the lower edge surface of the upper magnetic pole 76. An MR element 25 serving as an MR head is arranged behind the inductive head. A pair of leads 84 (not shown) and 85 are pulled out from the MR element 25. A reproduction output is derived on the basis of a resistance change of the MR element 25 due to a recording magnetism of the recording track 75. As a reproduction output by the MR element 25, a high reproduction output is obtained at any cylinder positions without depending on a change in peripheral velocity at the cylinder position depending on a radius of the recording medium.

In a combination type magnetic head in which the recording magnetic poles 76 and 80 and the MR element 25 are separately constructed and are away from each other by a few pm, a relative position between an inner recording track 112 and an outer recording track 114 by the recording magnetic pole 76 changes due to the positioning by the rotary positioner 22 in FIG. 1 as shown in FIG. 4A. Therefore, in order to on-track the MR element 25 to both of the inner recording track 112 and outer recording track 114, a center 118 in the track width direction of the recording magnetic pole 76 and a center 120 in the track width direction of the MR element 25 are purposely deviated by only a micro distance α, thereby constructing a magnetic head so that the MR element 25 is on-tracked onto a recording track in a whole region from the inner position to the outer position.

However, in such a conventional magnetic disk apparatus in which the combination head integratedly comprising the MR head and the inductive head is positioned by the rotary positioner, the head is arranged for each of both recording surfaces of the recording medium. For example, when the heads are vertically arranged, it is necessary to deviate the recording magnetic pole 76 and MR element 25 in the reverse direction for the head on the up-side and the head on the down-side. Namely, FIGS. 4A and 4B show an up-head 14-1 and FIGS. 5A and 5B show a down-head 14-2. As shown in FIGS. 4A and 5A, when both heads 14-1 and 14-2 are seen as plan views, the center 120 of the MR element 25 is deviated from the center 118 of the recording magnetic pole 76 toward the outer side by the predetermined amount α. However, since the down-head 14-2 corresponds to the head which is obtained by turning over the up-head 14-1 in FIG. 4B and oppositely arranging as shown in FIG. 5B, it is necessary to oppositely deviate the recording magnetic pole 76 and MR element 25. Therefore, it is necessary to prepare different masks in the head manufacturing step and, further, it is necessary to individually assemble the up-head and down-head to the arm in the head assembling step. There are problems such that the manufacturing step is complicated and the costs rise.

SUMMARY OF THE INVENTION

According to the invention, there are provided a magnetic disk apparatus and its reproducing method, in which a reproduction can be performed without causing an off-track in the whole region from the inner side to the outer side without needing to deviate a recording magnetic pole and a magneto-resistive element in the track width direction.

First, a magnetic disk apparatus of the invention has a structure in which a combination head integratedly comprising a read head (MR head) using a magneto-resistive element and a write head using an inductive head is moved to an arbitrary cylinder position of a recording medium by a rotation of an arm by a rotary type positioner. With respect to such a magnetic disk apparatus, the invention is characterized in that a sense current supplying circuit which supplies a predetermined sense current to the magneto-resistive element and can switch a direction of a sense current is provided, the direction of the sense current which is supplied from the sense current supplying circuit is switched in accordance with a cylinder position of a combination head by control means such as an MPU or the like, and a center position of a magnetic reproducing sensitivity of the magneto-resistive element is changed in the track width direction. The combination head has a structure such that a geometrical center position of the magneto-resistive element in the read head and a geometrical center position of a recording magnetic pole in the write head are made to coincide in the track direction. The combination head having such a structure is arranged on each of both medium surfaces of the recording medium. Namely, the same heads are used as an up-head and a down-head. Control means switches the direction of the sense current by the sense current supplying circuit in a manner such that in the case where the cylinder position of the combination head is located on the inner side, the center position of the reproducing sensitivity is changed to the position on the inner side for the geometrical center position of the magneto-resistive element, and that in the case where the cylinder position is located on the outer side, the center position of the reproducing sensitivity is changed to the position on the outer side for the geometrical center position of the magneto-resistive element. In the case where the combination head is arranged on each of both surfaces of the recording medium, namely, when one of the heads is arranged as an up-head and the other is arranged as a down-head, the control means switches the direction of the sense current by the sense current supplying circuit provided for each magneto-resistive element in a manner such that in the case where the cylinder position is located on the inner side for the geometrical center position of each magneto-resistive element in a pair of combination heads, both of the center positions of the reproducing sensitivities are changed to the position on the inner side. In the case where the cylinder position is located on the outer side, both of the center positions of the reproducing sensitivities are changed to the position on the outer side. This means that the directions of the sense currents which are supplied to the respective magneto-resistive elements of the up-head arranged on one of the surfaces of the recording medium and the down-head arranged on the other surface are set to the opposite directions. The control means switches the direction of the sense current which is supplied to the magneto-resistive element in a manner such that when a read error due to an off-track occurs, the center position of the reproducing sensitivity is moved in such a direction as to reduce an off-track amount. In the magneto-resistive element which is used as a read head, a change amount of the center position in the track width direction of the reproducing sensitivity due to the switching of the sense current lies within a range from about 1.0 μm to 2.0 μm for the geometrical center position of the magneto-resistive element.

According to the invention, there is provided a reproducing method of a magnetic disk apparatus, in which a read head using a magneto-resistive element is moved to an arbitrary cylinder position of a recording medium by a rotation of an arm. The invention is characterized in that the direction of the sense current which is supplied to the magneto-resistive element of the read head is switched in accordance with the cylinder position of the head, and the center position of the magnetic reproducing sensitivity of the magneto-resistive element is changed in the track width direction. The details in the reproducing method are fundamentally the same as the construction of the apparatus.

According to the magnetic disk apparatus and its reproducing method of the invention, the characteristics such that the center position of the reproducing sensitivity of the magneto-resistive element provided for the read head is changed according to the direction of the sense current are used, the combination head is constructed by making the center position in the track width direction of the magneto-resistive element in the read head coincide with the center position in the track width direction of the recording magnetic pole in the write head, and the center of the reproducing sensitivity is deviated by switching the sense current direction, thereby coping with a change in track position on the inner and outer sides by the rotary positioner. Therefore, the up-head and down-head can be commonly constructed. By reversing the directions of the sense currents on the inner and outer sides, the reproducing sensitivity is controlled so that the center of the reproducing sensitivity is moved to the inner position in case of the inner side and is moved to the outer position in case of the outer side. Thus, it is possible to accurately on-track.

The above and other objects, features, and advantages of the present invention will become more apparent from the following detailed description with reference to the drawings.

BRIEF DESCRIPTION OF THE DRAWINGS

FIG. 7 is an explanatory diagram of an internal structure of the invention;

FIG. 8 is a cross sectional view of FIG. 7;

FIG. 17 is an explanatory diagram showing the directions of the sense currents on the inner and outer sides with respect to the up-head and down-head.

DETAILED DESCRIPTION OF THE PREFERRED EMBODIMENT

Figure 6:
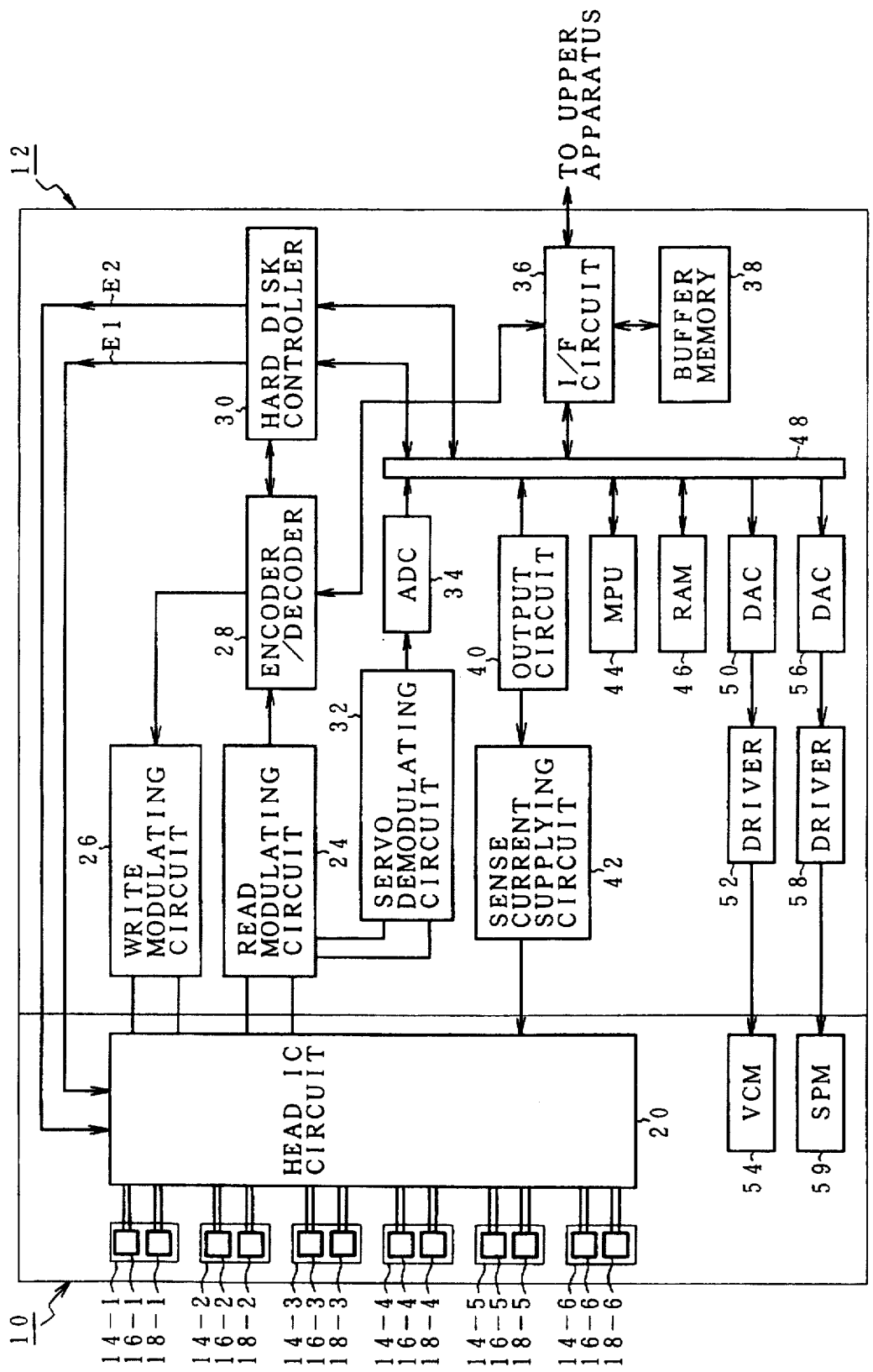
FIG. 6 is a block diagram of the invention.

FIG. 6 is a block diagram of a disk apparatus to which the invention is applied and shows a case of using a data surface servo system as an example. In FIG. 6, the disk apparatus is constructed by a disk enclosure 10 and a drive controller 12. This unit is referred to as a "disk drive" or is simply called a "drive" for an upper disk controller. In the embodiment, six combination heads 14-1 to 14-6 are provided for the disk enclosure 10. Write heads 16-1 to 16-6 and read heads 18-1 to 18-6 are provided for the combination heads 14-1 to 14-6, respectively. Inductive heads are used as write heads 16-1 to 16-6. What are called MR heads using magneto-resistive elements (hereinafter, simply referred to as "MR elements") are used as read heads 18-1 to 18-6. The combination heads 14-1 to 14-6 are connected to a head IC circuit 20 and are selected by a head switching signal E1 and a read/write switching signal E2 from the drive controller 12 side. In the reading operation, the head IC circuit 20 selects any one of the combination heads 14-1 to 14-6, for example, the combination head 14-1 by the head switching signal E1. At the same time, when the reading side is made valid by the read/write switching signal E2, the read head 18-1 in the combination head 14-1 is selected and connected to a read modulating circuit 24 provided on the drive controller 12 side. In the read modulating circuit 24, after a read signal from the read head 18-1 was amplified by an AGC amplifier, an equalization to eliminate an interference between waveforms is executed by an equalizer, and bit data is decoded by a maximum likelihood detection according to a Viterbi algorithm. A VFO circuit is provided for the read modulating circuit 24 and a clock signal for setting a timing necessary for demodulation of the read data is produced. The data demodulated by the read modulating circuit 24 is supplied to an encoder/decoder 28. Since the encoder/decoder 28 has been switched to the decoder side in the reading operation and the demodulated data is, for example, a predetermined RLL code, it is converted to original NRZ data. The NRZ data which was encoded by the encoder/decoder 28 is converted into the parallel data by an interface circuit 36. After that, the parallel data is transferred to an upper controller via a buffer memory 38. A hard disk controller 30 executes a head switching and a read/write switching for the read modulating circuit 24 and a write modulating circuit 26 provided in the drive controller 12 and, further, for the head IC circuit 20 of the disk enclosure 10. If necessary, further, in the reading operation, the hard disk controller 30 also functions as a formatter for executing an ECC process or the like for the NRZ data, as a target, derived by the encoding function of the encoder/decoder 28. In the writing operation, the writing side of the head switching signal E1 and read/write switching signal E2 for the head IC circuit are made valid and, for example, the write head 16-1 of the combination head 14-1 is selected. For the write head 16-1, the NRZ data transferred from the upper controller is supplied as serial NRZ data to the encoder/decoder 28 via the interface circuit 36. In the writing operation, the encoder/decoder 28 operates as a decoder and converts the NRZ data into a predetermined RLL code and outputs to the write modulating circuit 26. Assuming that the maximum likelihood detection of, for example, a partial response class 4 is performed in the read modulating circuit 24, the write modulating circuit 26 performs a precoding of 1/(1+D) conversion to the RLL code from the encoder/decoder 28 and executes a write compensation. The RLL code is latched by a write FF and, after that, it is converted to a recording current by a write drive. The recording current is supplied to the write head 16-1 selected by the head IC circuit 20, thereby performing the writing to the recording medium. A servo demodulating circuit 32 is provided in order to position the head to an arbitrary cylinder position of the disk medium. In the embodiment, a data surface servo (sector servo) in which servo information has been buried and recorded into a servo frame provided at the head of each sector of the data surface is used. Therefore, the read signal from the read head is fetched into the servo demodulating circuit 32 through the read modulating circuit 24 and head position information is demodulated from the servo information included in the servo frame. An RAM 46 for developing control data and a processing program through an A/D converter 34 and a bus 48 is provided. Various commands received from an upper apparatus by the interface circuit 36 can be received through the bus 48. When receiving a seek command from the upper controller through the interface circuit 36, the MPU 44 performs a seek control for moving the head to a target cylinder position designated by the seek command. When the head reaches the target cylinder position, the MPU 44 executes a fine control for positioning the head to the center of a target cylinder and tracing the head. For such a head positioning control by the MPU 44, a D/A converter 50 and a driver 52 are provided through the bus 48 for a voice coil motor (hereinafter, abbreviated to a "VCM") 54 to drive a rotary positioner provided for the disk enclosure 10. Further, a D/A converter 56 and a driver 58 are provided for a spindle motor 59 provided for the disk enclosure 10. The recording medium is rotated at a constant velocity by the control of the spindle motor 59.

Further, in the invention, the MR elements are used as read heads 18-1 to 18-6 in the combination heads 14-1 to 14-6. For the reproducing operation of the MR element, it is necessary to supply a sense current to form a predetermined bias magnetizing direction. Therefore, a sense current supplying circuit 42 is provided for the drive controller 12. A predetermined sense current is supplied to the MR element provided for the read head of the combination head selected by the head IC circuit 20. The sense current supplying circuit 42 of the invention has a circuit function for switching the direction of the sense current which is supplied to the MR element. The switching of the direction of the sense current is performed by a command from the MPU 44. A switching control signal is generated from an output circuit 40 to the sense current supplying circuit 42. The switching of the direction of the sense current for the MR element by the sense current supplying circuit 42 depends on the head structure in the combination head of the invention, which will be clearly explained hereinlater. That is, a principle such that the center position of the magnetic reproducing sensitivity in the MR element is deviated by the switching of the direction of the sense current is used. A switching control of the sense current is executed in a manner such that when the head is located on the inner side, the center position of the reproducing sensitivity is further deviated to the inner side. When the head is located on the outer side, the center position of the reproducing sensitivity is further deviated to the outer side.

FIG. 7 shows an example of an internal structure of the disk apparatus of the invention. A recording medium 15-1 which is rotated by the spindle motor 59 is provided in the apparatus. As will be obviously understood from a cross sectional view of FIG. 8, as a number of recording media, three recording media 15-1, 15-2, and 15-3 are provided. For example, magnetic disks of 3.5 inches are used. The rotary positioner 22 is provided for the recording medium 15-1 side. According to the rotary positioner 22, the combination head 14-1 supported by a tip of an arm 74 through a suspension 77 is rotated around a rotary axis 23 as a center by the VCM 54 provided in the rear portion. The head IC circuit 20 is installed near the rotary positioner 22 by a flexible printed board, thereby performing an electric connection between the head IC circuit 20 and the rotary positioner 22 by a printed circuit of a band of the flexible printed board. In the cross sectional view of FIG. 8, among the combination heads 14-1 to 14-6 provided at the tip of the rotary positioner 22, the combination heads 14-1, 14-3, and 14-5 are arranged on the upper medium surfaces of recording media 15-1, 15-2, and 15-3, so that those heads can be regarded as up-heads. On the other hand, since the combination heads 14-2, 14-4, and 14-6 are arranged on the lower surface sides of the recording media 15-1 to 15-3, they can be regarded as down-heads. The relation between the up-head and the down-head is obviously a relative relation. Assuming that the head arranged for one surface of the recording medium is the up-head, the head arranged for the other surface is the down-head.

Figure 1:
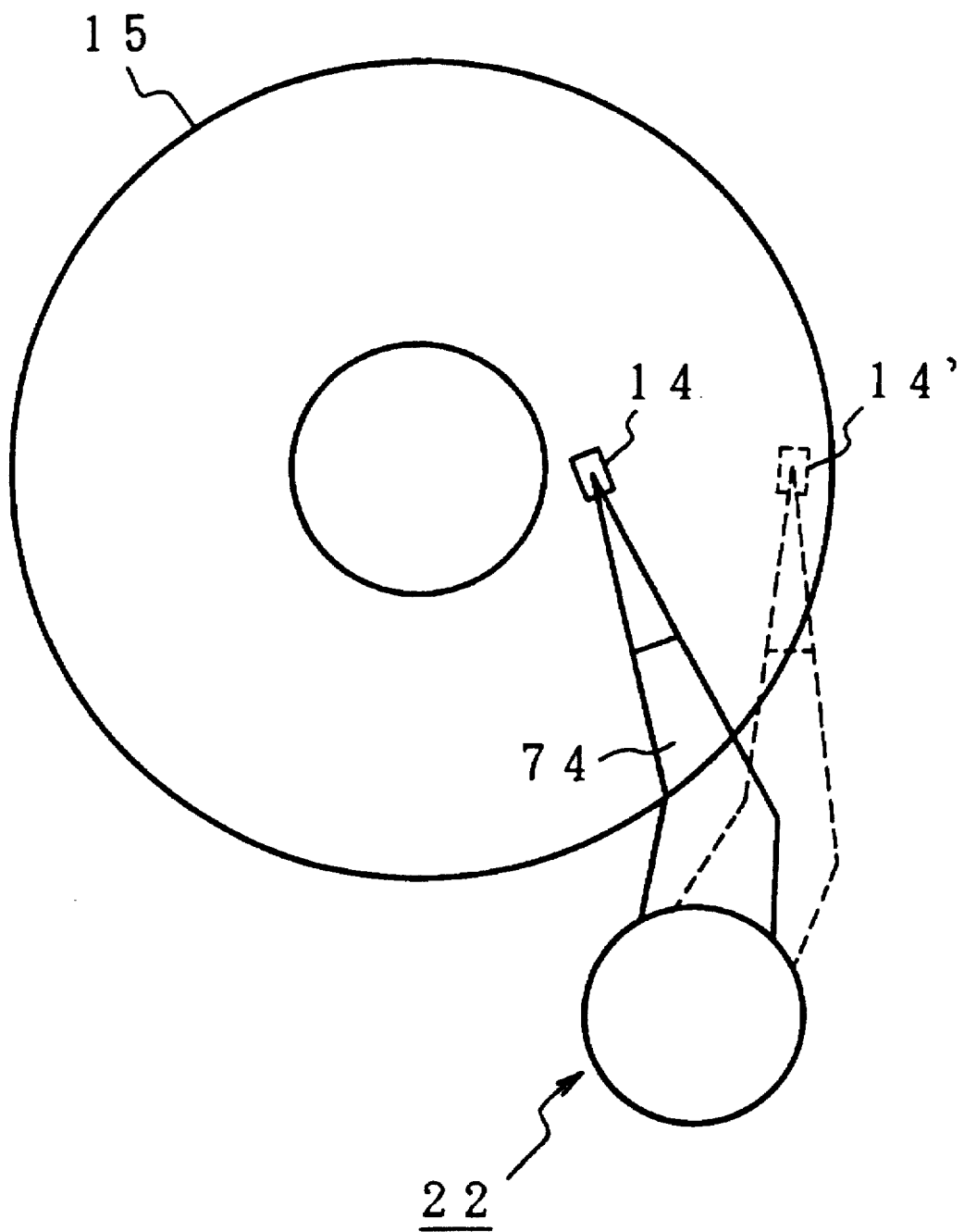
FIG. 1 is an explanatory diagram of a conventional rotary positioner.
Figure 2:
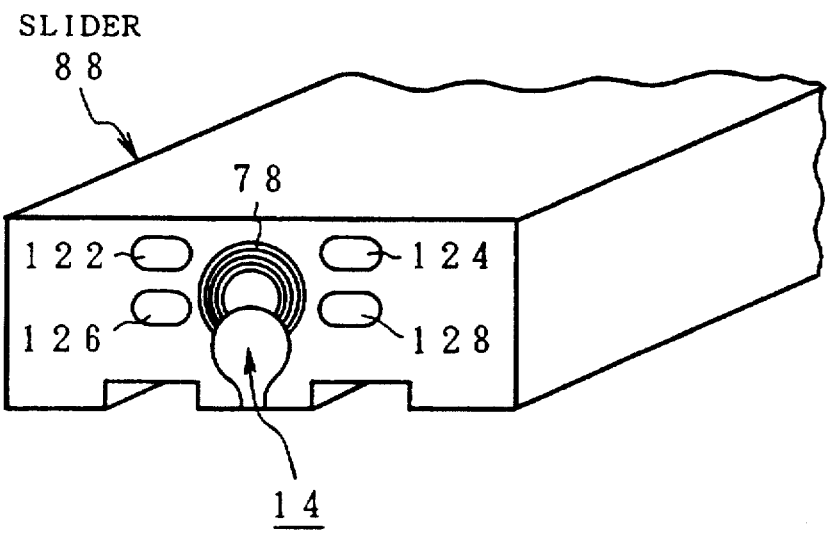
FIG. 2 is an explanatory diagram of a conventional combination head.
Figure 3:
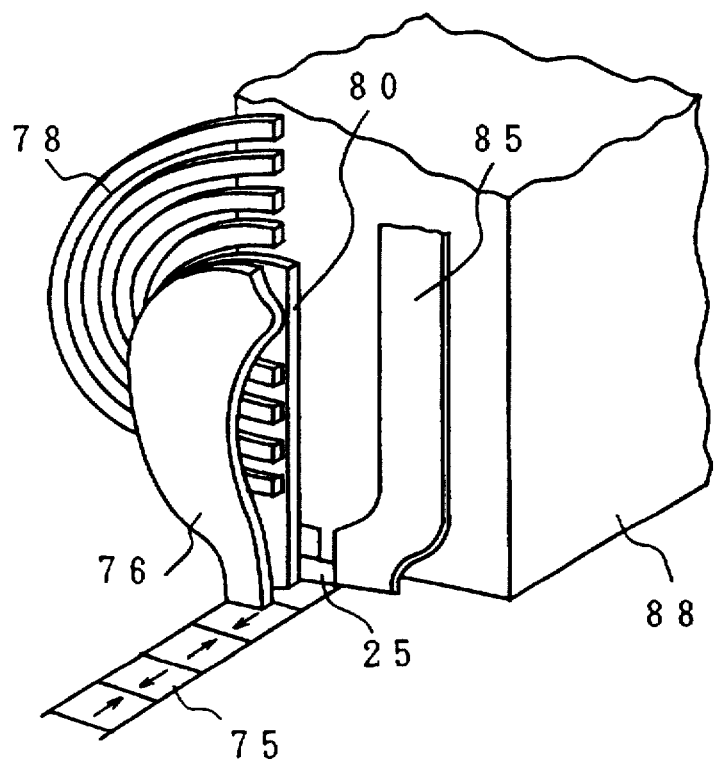
FIG. 3 is an enlarged exploded diagram of a head structure of FIG. 2.
Figure 4A:
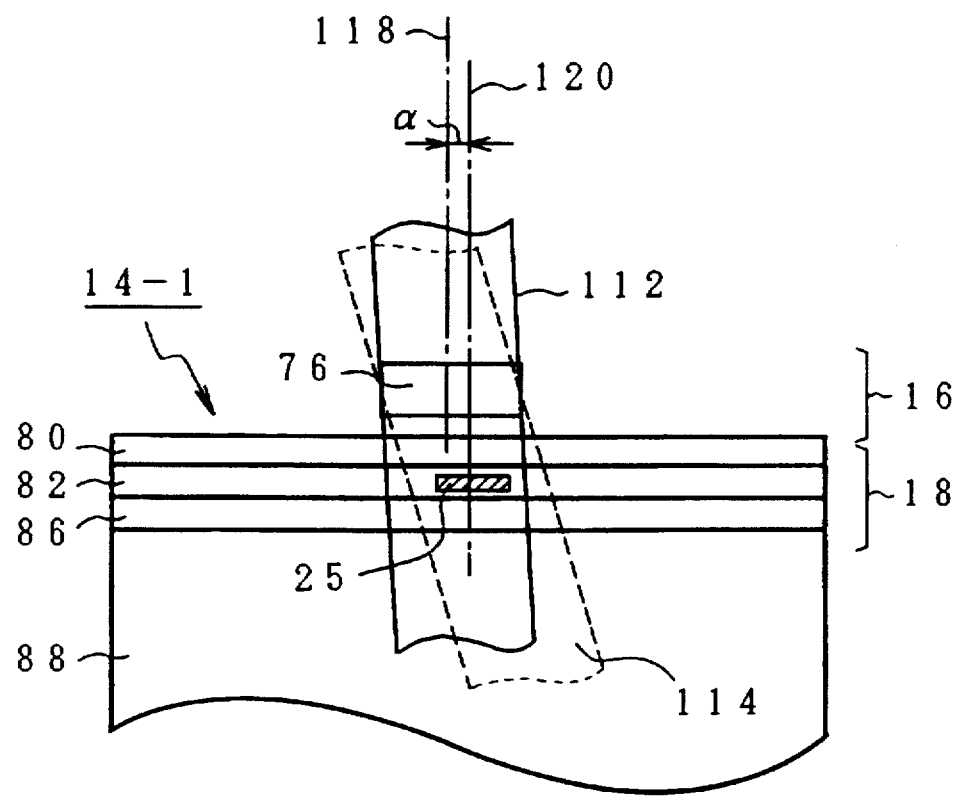
FIGS. 4A and 4B are explanatory diagrams of a conventional up-head.
Figure 4B:
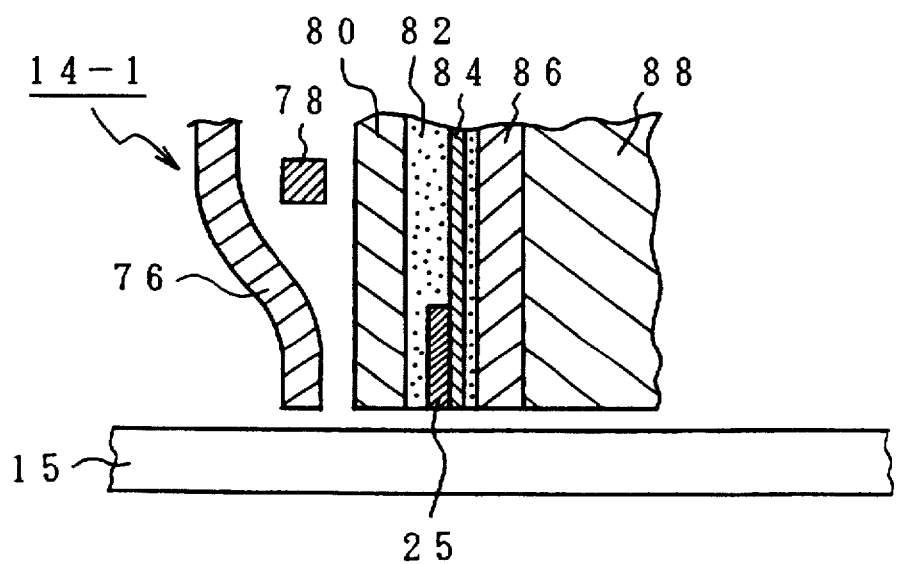
Figure 5A:
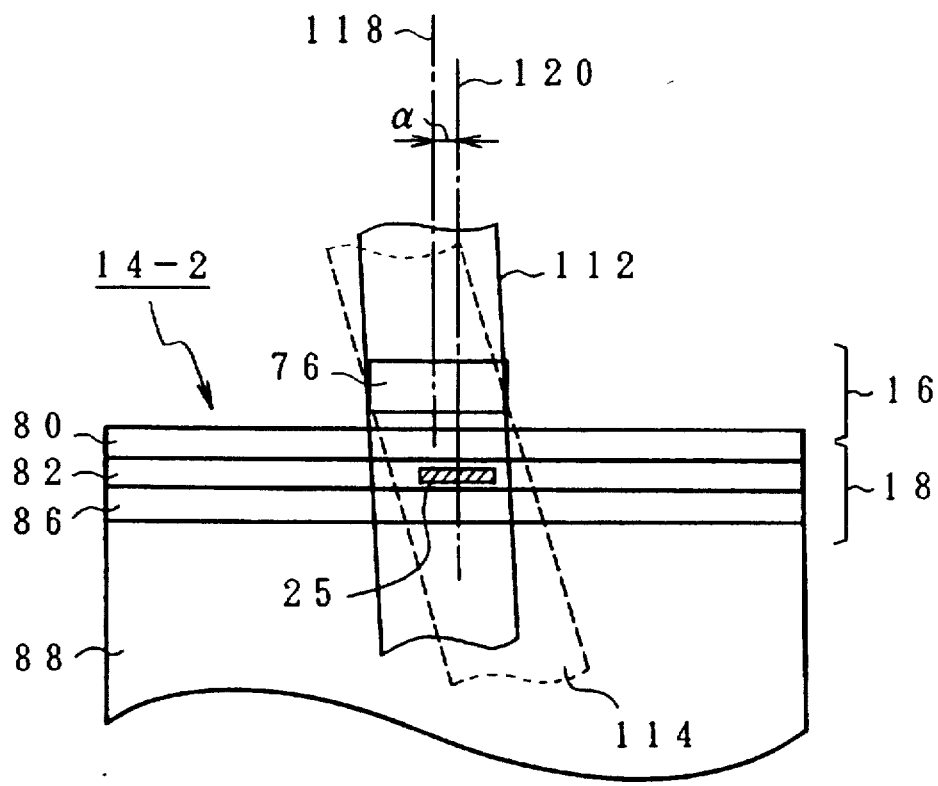
FIGS. 5A and 5B are explanatory diagrams of a conventional down head.
Figure 5B:
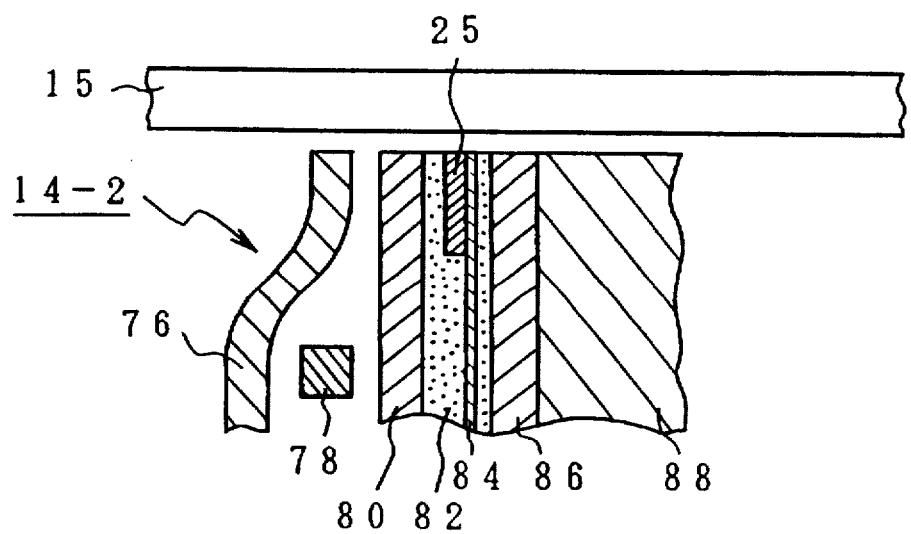
Figure 9A:
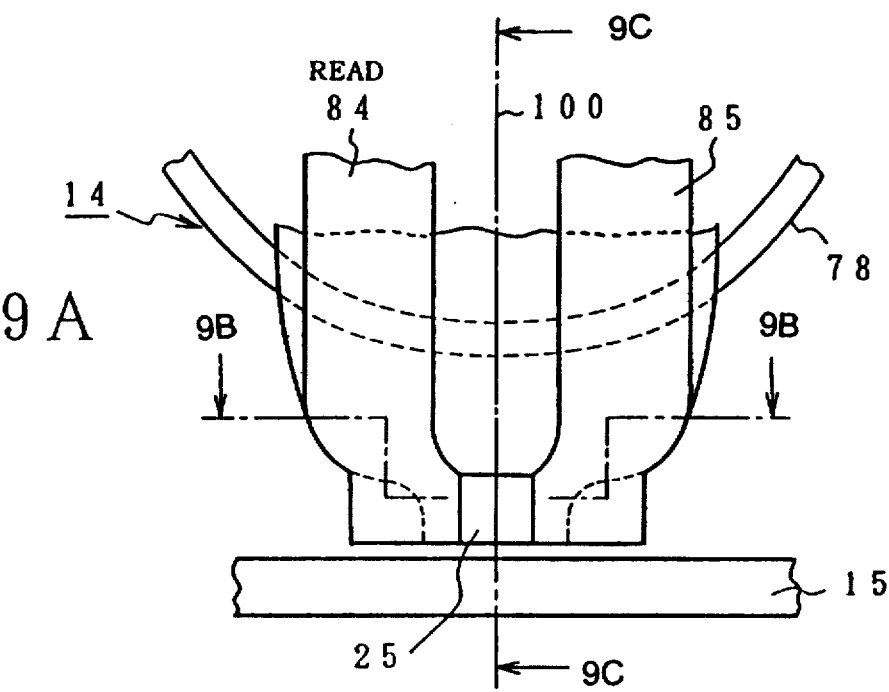
FIGS. 9A to 9C are explanatory diagrams of a head structure of the invention.
Figure 9B:
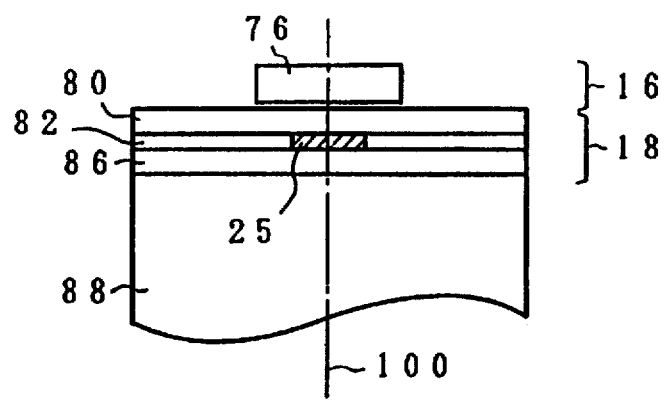
Figure 9C:
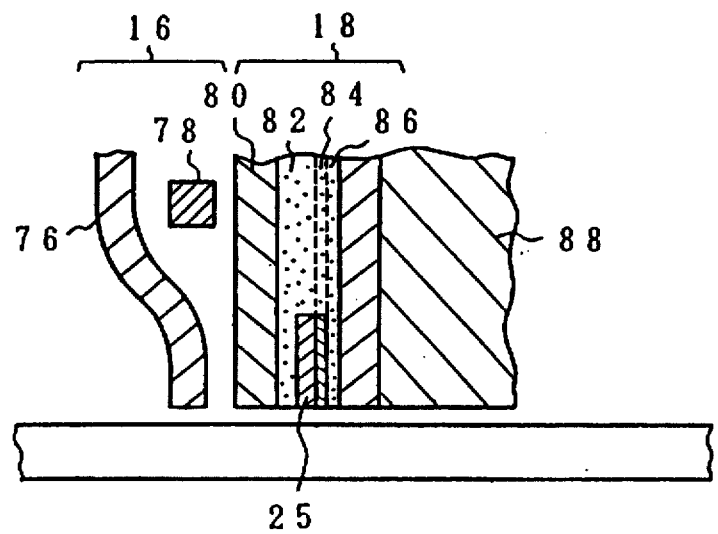

FIGS. 9A to 9C show a structure of a combination head which is used in the magnetic disk apparatus of the invention. FIG. 9A is a front view when it is seen from the head attaching side. FIG. 9B is a cross sectional view taken along the line X—X in FIG. 9A. FIG. 9C is a cross sectional view taken along the line Y—Y in FIG. 9A. As will be obviously understood from FIG. 9C, in the combination head 14, a write head 16 is provided on the head edge side and a read head 18 is provided behind the write head 16. The write head 16 has a structure as an inductive head comprising the upper magnetic pole 76, coil 78, and lower magnetic pole 80. The lower magnetic pole 80 also has a function as a magnetic shield from the read head 18. The read head 18 is connected to leads 84 and 85 (refer to FIG. 9A) as lead conductors and has the magneto-resistive element (hereinafter, referred to as an "MR element") 25 in an insulating layer 82. Further, the read head 18 is integratedly provided on a slider 88 as a substrate through a magnetic shield 86. In the write head 16 and read head 18 as mentioned above, as shown in the cross sectional view when it is seen from a plan view of FIG. 9B, a geometrical center position in the track width direction of the MR element 25 provided for the read head 18 is made coincide with a geometrical center position 100 in the track width direction of the upper magnetic pole 76 and lower magnetic pole 80 of the write head 16 constructing the inductive head. Namely, as shown in FIG. 5A, hitherto, for the center position 118 of the magnetic poles 76 and 80 of the inductive head, the center position 120 of the MR element 25 is deviated to the outer side by a predetermined amount α in order to prevent an off-track of the relative position change of the recording track 114 on the outer side. However, according to the invention, as shown in FIG. 9B, the geometrical center positions 100 of both magnetic poles are made coincide. As mentioned above, since the geometrical center positions of the magnetic poles 76 and 80 in the write head 16 and the MR element 25 in the read head 18 are made coincide, a probability such that the MR element 25 is off-tracked for the recording track on the inner and outer sides rises. Therefore, the center of the magnetic reproducing sensitivity in the MR element 25 is deviated by the switching of the current direction by the sense current supplying circuit 42 in FIG. 10, thereby preventing the off-track for the recording track.

Figure 10:
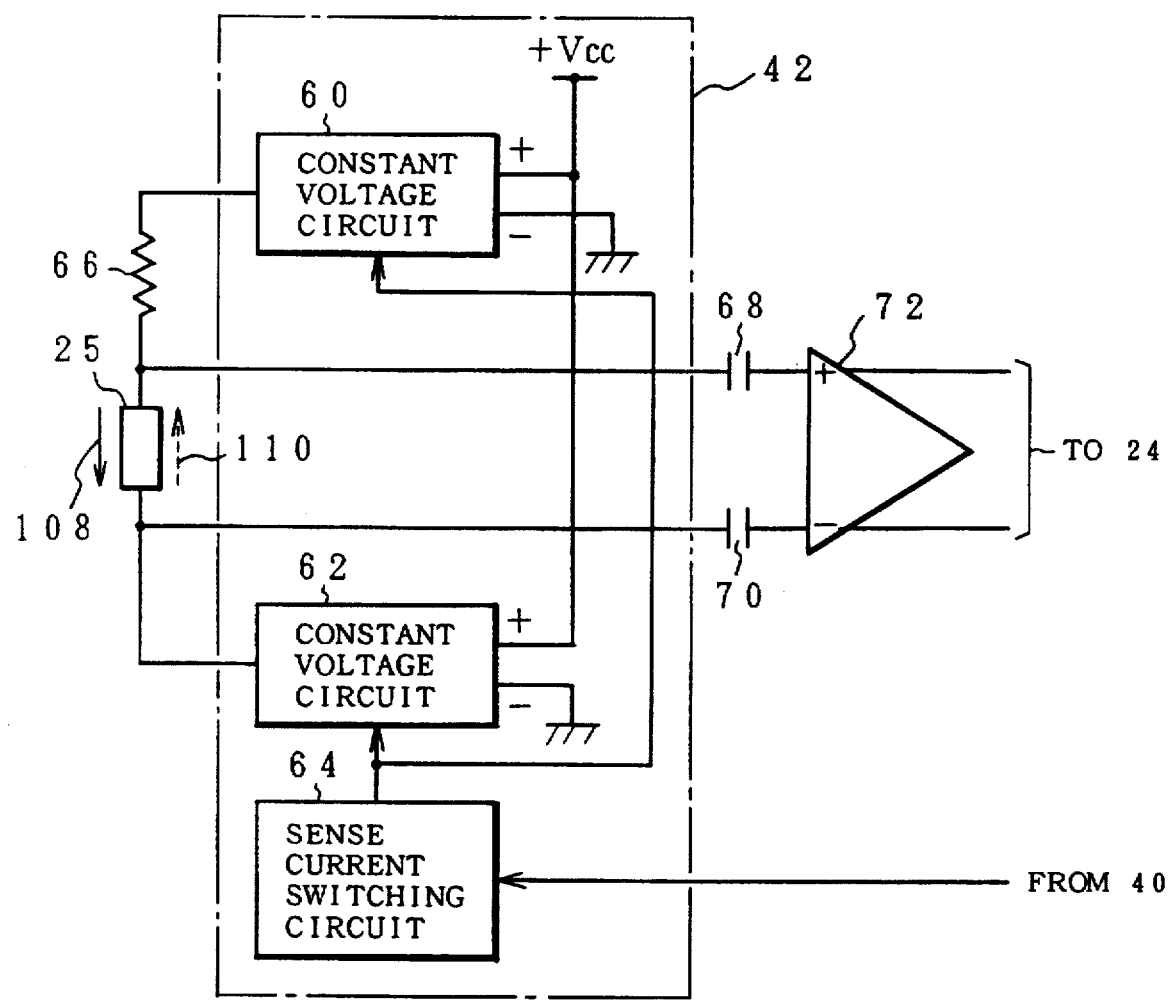
FIG. 10 is a circuit block diagram of a sense current supplying circuit in FIG. 6.

The sense current supplying circuit 42 in FIG. 10 has constant voltage circuits 60 and 62 and a sense current switching circuit 64. The constant voltage circuits 60 and 62 receive a power source voltage +Vcc from a power supply circuit. An output polarity of either one of the constant voltage circuits 60 and 62 for the MR element 25 is set to + and that of the other constant voltage circuit is set to −. A sense current which is decided by a constant voltage in a fixed resistor 66 and the constant voltage circuits 60 and 62 is supplied to the MR element 25. The switching of the sense current direction by the constant voltage circuits 60 and 62 is performed by a switching control signal based on the MPU 44 from the output circuit 40 for the sense current switching circuit 64. For example, when the head is located to the outer side, a forward direction switching signal is supplied from the output circuit 40 to the sense current switching circuit 64. The sense current switching circuit 64 supplies a forward direction sense current 108 from the constant voltage circuit 60 to the constant voltage circuit 62. When a reverse direction switching signal E12 is generated from the output circuit 40 to the sense current switching circuit 64, the switching circuit 64 is set to a switching state for supplying a reverse direction sense current 110 to the constant voltage circuit 60 from the constant voltage circuit 62. Specifically speaking, the sense current switching circuit 64 reversibly performs the connection to the + power source side of an analog switching element and the connection to the ground side for an output line of the MR element 25 provided for the constant voltage circuits 60 and 62. Both ends of the MR element 25 are inputted to a differential amplifier 72 through capacitors 68 and 70 for cutting out a direct current. The differential amplifier 72 is an amplifier of a fixed gain and outputs a differential signal to the read modulating circuit 24 in FIG. 6. A circuit portion of the differential amplifier 72 and capacitors 68 and 70 is built in the head IC circuit 20 in FIG. 6. In FIG. 10, actually, a head switching circuit in the head IC circuit 20 is provided between the MR element 25 and the differential amplifier 72. However, for simplicity of explanation, the portion of the head switching circuit is omitted.

Figure 11:
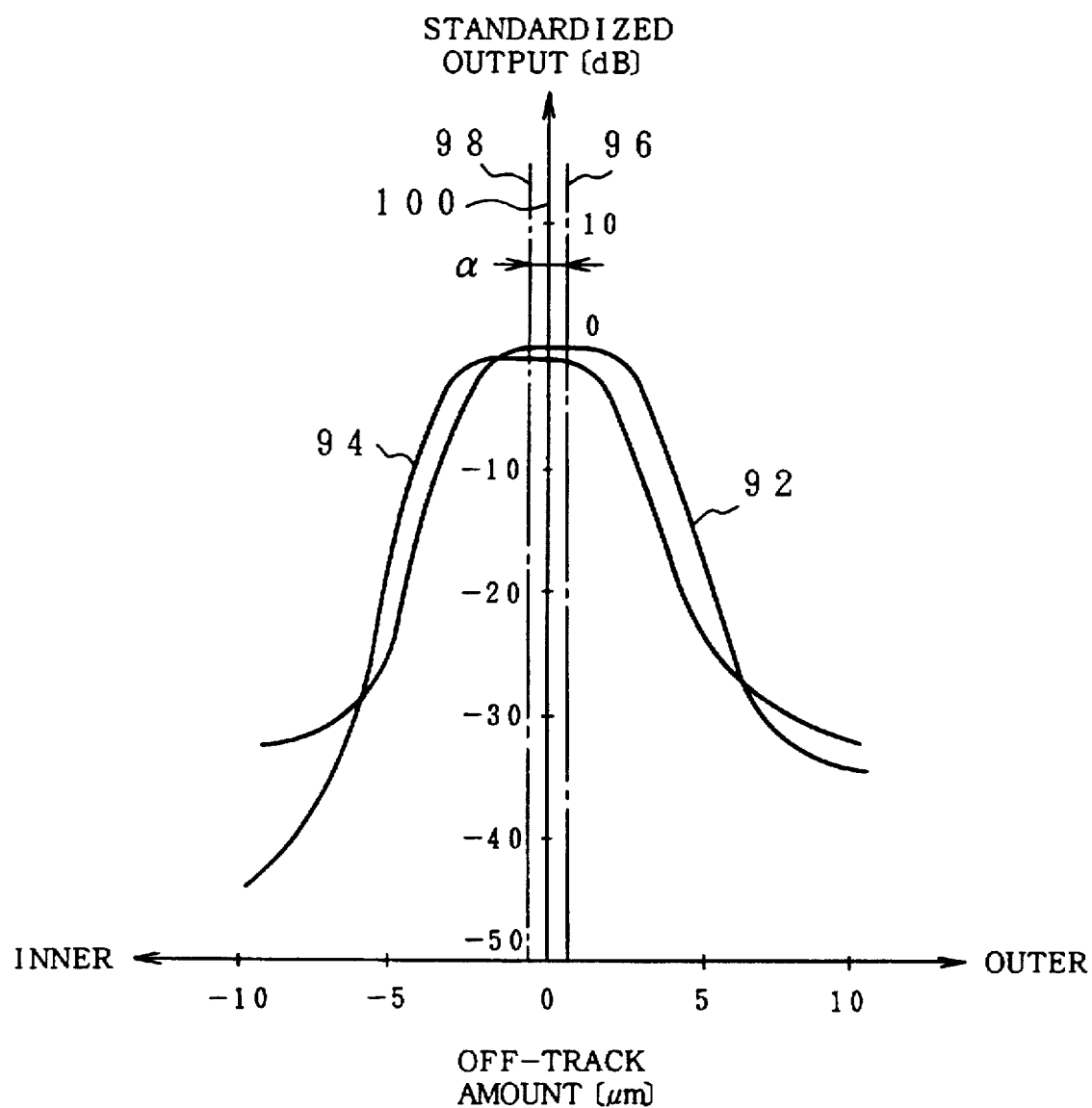
FIG. 11 is a characteristics diagram of a standardized output for an off-track amount when a sense current in a head of the invention is switched.

FIG. 11 shows results of the actual measurement of a standardized output shown by an axis of ordinate for an off-track shown by an axis of abscissa in the case where the sense current in the forward direction is supplied to the MR element 25 provided for the combination head 14 in FIG. 9 and in the case where the sense current in the reverse direction is supplied. First, when the head is moved from the inner side to the outer side with respect to a specific recording track in a state in which the sense current in the forward direction is supplied to the MR element 25, forward direction characteristics 92 are derived. When the standardized output in case of moving from the inner side to the outer side with respect to the same track in a state in which the sense current in the reverse direction is supplied to the MR element 25 is plotted, reverse direction characteristics 94 are derived. When the forward direction characteristics 92 in case of supplying the forward direction sense current to the MR head as mentioned above are observed, the center position of the flat portion in which standardized output is equal to 0 dB and the reproducing sensitivity is highest is set to a center position 96. This position is likewise a position which is deviated to the outer side for the head center position 100 of the off-track amount 0 as a geometrical center position in the width direction of the recording track. When observing the reverse direction characteristics 94 which are obtained when the sense current in the reverse direction is supplied to the MR element, a center position 98 of the reproducing sensitivity in the flat portion of 0 dB in which the standardized output is maximum is set to a position which is deviated to the inner side for the geometrical center position 100 of the head. The width α from the center position 96 of the reproducing sensitivity in the forward direction characteristics 92 for the geometrical head center position 100 to the center position 98 of the reproducing sensitivity on the inner side in the reverse direction characteristics 94 is equal to a value of about 1.0 to 2.0 μm according to the actual measurement.

Figure 12A:
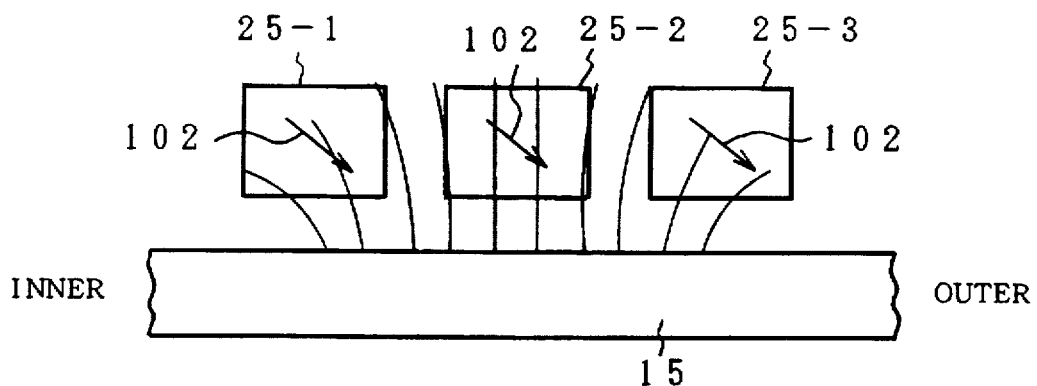
FIGS. 12A to 12C are explanatory diagrams of the relation between a bias magnetic field of a magneto-resistive element and a magnetic field of a recording track in case of supplying the sense current in the direction opposite to the forward direction.
Figure 12B:
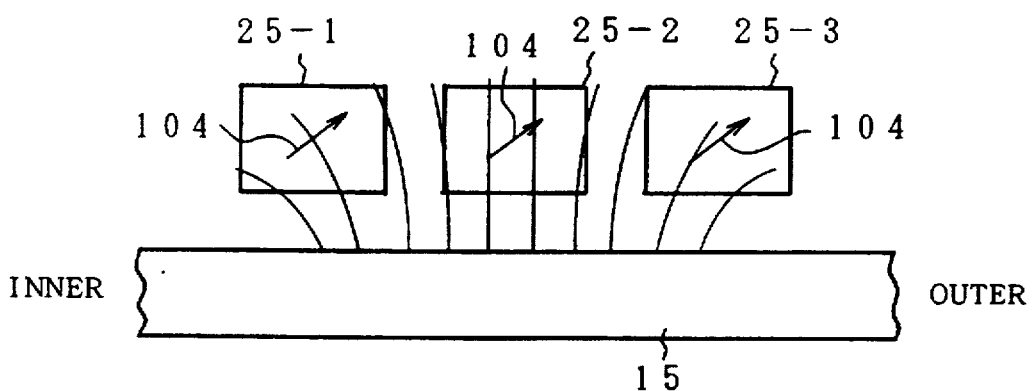
Figure 12C:
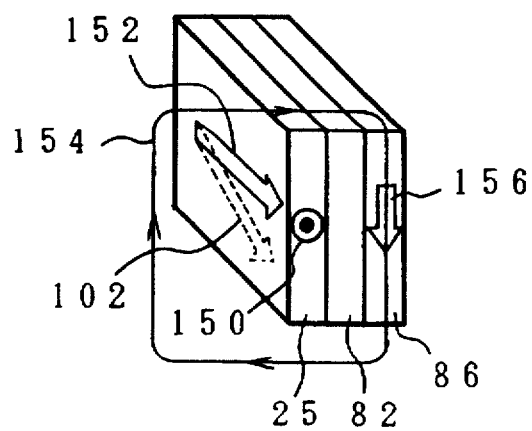

FIG. 12A shows a bias magnetization 102 when the sense current in the forward direction is supplied to the MR element and a state in which lines of magnetic force from a recording medium 15 when the MR element is moved in the width direction of the recording track as shown at head positions 25-1 to 25-3 transverse. Similarly, FIG. 12B shows a case where the sense current in the reverse direction is supplied to the MR element. First, the bias magnetization 102 in FIG. 12A is obtained as shown in FIG. 12C. Namely, it is now assumed that a sense current 150 is supplied to the MR element (MR layer) 25 from this side toward the rear side. By the sense current 150, a magnetization 152 in the direction opposite to the current direction occurs in the MR element 25. A clockwise magnetic field 154 is generated around the sense current 150 and passes through a magnetic layer by the magnetic shield 86 through the non-magnetic insulating layer 82, so that a magnetization 156 in the vertical direction occurs. The bias magnetization 102 in the oblique direction is derived by a synthesization of the magnetization 156 in the vertical direction and the magnetization 154 in the horizontal direction of the MR element 25. On the other hand, in case of supplying the sense current in the opposite direction as shown in FIG. 12B, the direction of the magnetization 156 in the magnetic layer 86 in FIG. 12C is reversed, so that the direction of the bias magnetization of the MR element 25 is set to the oblique downward direction.

In the oblique downward bias magnetization 102 in FIG. 12A, when the MR head is located on the inner side for the recording track as shown at the position 25-1, the number of crossing times of the leakage magnetic field to the bias magnetization 102 is small, so that the standardized output is also low. On the other hand, at the center position 25-2 of the recording track, since the MR element is located just above the recording track, the number of crossing times of the leakage magnetic field is maximum, so that the reproducing sensitivity reaches the peak. Further, even when the MR element is moved to the position 25-3 on the outer side, a decrease in number of crossing times of the leakage magnetic field for the bias magnetization 102 is small. Therefore, the center position 96 of the reproducing sensitivity is changed to the outer side as shown in the forward direction characteristics 92 in FIG. 11. On the other hand, with regard to an oblique upward bias magnetization 104 in case of supplying the sense current in the reverse direction in FIG. 12B, the leakage magnetic flux from the recording medium 15 is small at the position 25-3 on the outer side and is maximum at the position 25-2 where the MR element is located just above the recording track. Even when the MR element is moved to the position 25-1 on the inner side, the number of crossing times doesn't change. Therefore, characteristics in which the center position 98 of the reproducing sensitivity is shifted to the inner side as shown in the reverse direction characteristics 94 in FIG. 11 are obtained.

Figure 13:
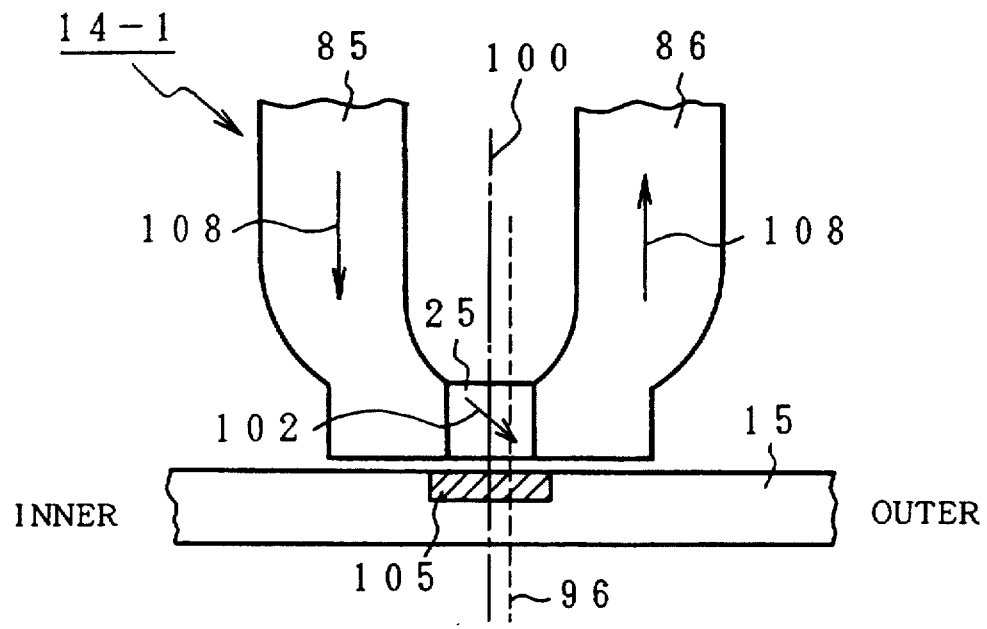
FIG. 13 is an explanatory diagram of a change in center position of a reproducing sensitivity of the magneto-resistive element in case of supplying the sense current in the forward direction.

FIG. 13 shows a state in which the geometrical center position 100 of the MR element 25 is made coincide with a recording track 105 of the recording medium 15 with respect to the up-head 14-1 as an example and the sense current 108 in the forward direction is supplied in this state. By the bias magnetization 102 of the MR element 25 which is caused by the sense current 108 in the forward direction, the center position in the track width direction of the reproducing sensitivity is deviated to the outer side as shown at the center position 96 as shown in the forward characteristics 92 in FIG. 11.

Figure 14:
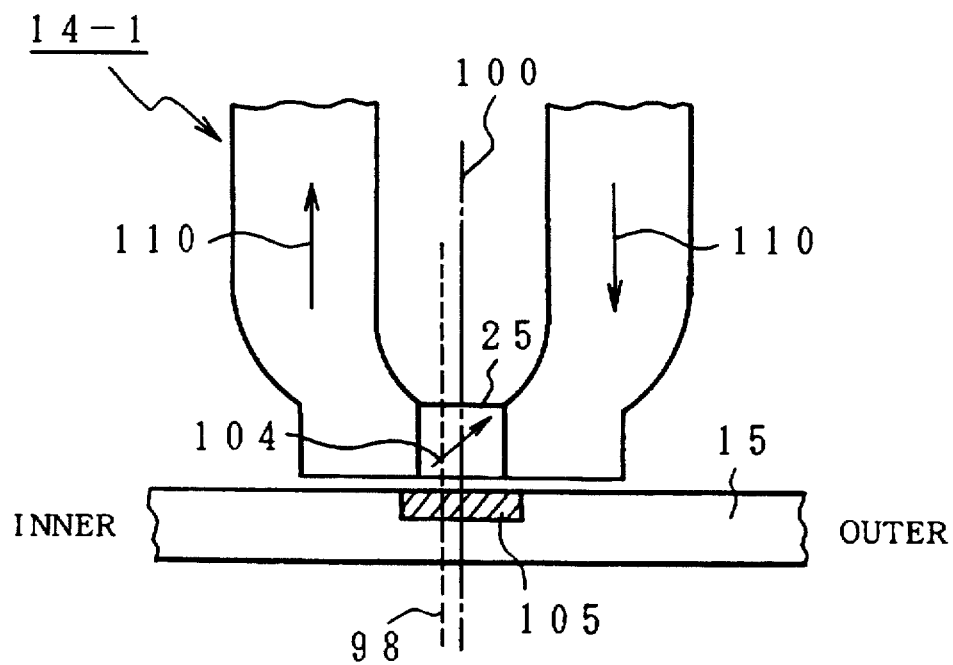
FIG. 14 is an explanatory diagram of a change in center position of the reproducing sensitivity of the magneto-resistive element in case of supplying the sense current in the reverse direction.

FIG. 14 shows a case where the sense current 110 in the reverse direction is supplied to the MR element 25 with respect to the up-head 14-1 as an example. By supplying the sense current 110 in the reverse direction, the MR element 25 causes the bias magnetization 104 and the center position of the reproducing sensitivity is deviated to the position 98 on the inner side in accordance with the reverse direction characteristics 94 in FIG. 11.

Figure 15A:
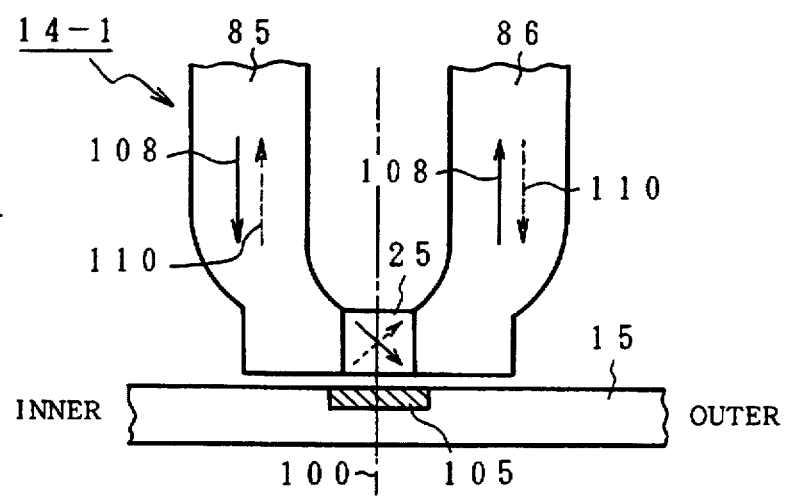
FIGS. 15A to 15C are explanatory diagrams of the relation between the direction of the sense current and the center position of the reproducing sensitivity on the inner and outer sides in the up-head.
Figure 15B:
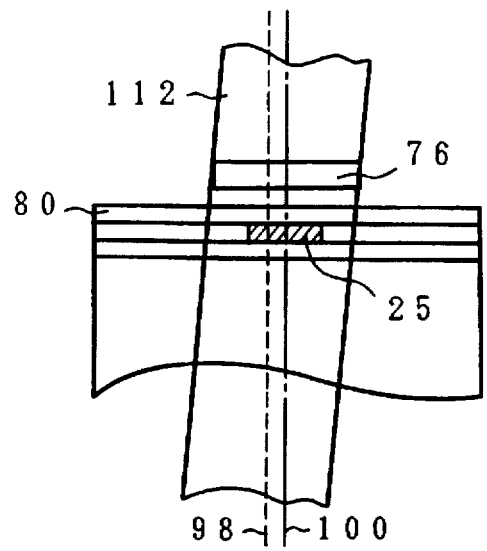
Figure 15C:
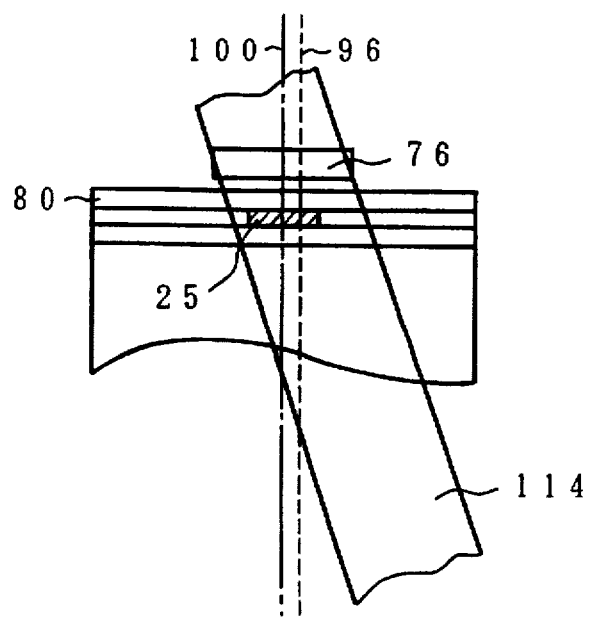

FIGS. 15A to 15C show the relations of the center positions of the reproducing sensitivities in each recording track on the inner and outer sides in case of switching the sense current to the forward direction and the reverse direction with respect to the up-head 14-1. Namely, FIG. 15A shows the position of the MR element 25 for the up-head 14-1 for the recording medium 15. By switching the polarity of the constant voltage for an interval between the leads 84 and 85, the forward direction sense current 108 or reverse direction sense current 110 are supplied. FIG. 15B shows the positional relation of the inner recording track 112 for the MR element 25 when the head is located on the inner side. In the case where the MR element 25 is located to the inner recording track 112, the reverse direction sense current 110 is supplied to the MR element 25 and the center position of the reproducing sensitivity is set to the position 98 on the further inner side, so that the off-track for the inner recording track 112 can be prevented. On the other hand, when the head of FIG. 15C is located to the outer track, by supplying the forward direction sense current 108 to the MR element 25, the center position of the reproducing sensitivity is shifted to the position 96 on the further outer side, thereby preventing the off-track for the outer recording track 114.

Figure 16A:
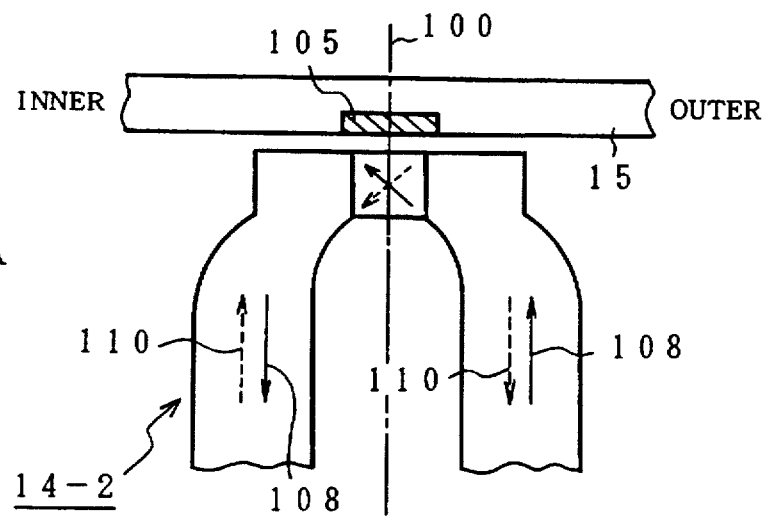
FIGS. 16A to 16C are explanatory diagrams of the relation between the direction of the sense current and the center position of the reproducing sensitivity on the inner and outer sides in the down-head.
Figure 16B:
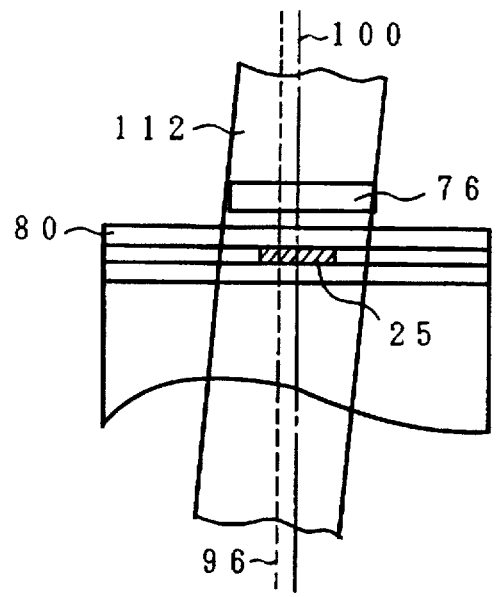
Figure 16C:
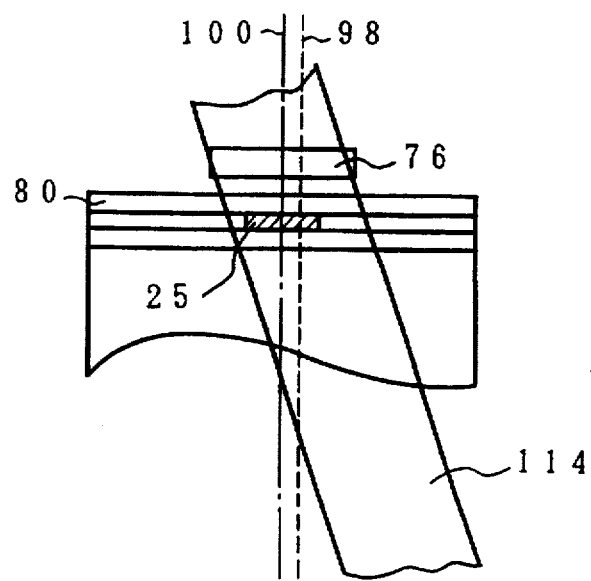

FIGS. 16A to 16C show a method of shifting the center position of the reproducing sensitivity by the switching of the sense current for the recording tracks on the inner and outer sides. First, in the down-head 14-2 in FIG. 16A, since the up-head 14-1 in FIG. 15A is arranged upside down on the lower side of the recording medium 15, the left and right positions of the leads 84 and 85 are exchanged. The sense current which is supplied from the lead 84 to the direction of the lead 85 is set to the forward direction current 108. The sense current which is supplied from the lead 86 to the direction of the lead 85 is set to the reverse direction sense current 110. Therefore, when the forward direction sense current 108 is supplied to the MR element 25, the center position 98 of the reproducing sensitivity of the MR element 25 is deviated to the inner side like an inner track of FIG. 16B in a manner opposite to the case of the up-head 14-1 in FIGS. 15A to 15C. When the reverse direction sense current 110 is supplied to the MR element 25 of the down-head 14-2, the center position 96 of the reproducing sensitivity is deviated to the outer side as shown in FIG. 16C in a manner opposite to the case of the up-head 14-1 in FIGS. 15A to 15C. Thus, in the down-head 14-2, when the MR element 25 is located at the inner recording track 112 in FIG. 16B, the forward direction sense current 108 is supplied, thereby setting the center position of the reproducing sensitivity to the position 96 on the further inner side. When the MR element is located at the outer recording track 114 as shown in FIG. 16C, by supplying the reverse direction sense current 110, the center position of the reproducing sensitivity is deviated to the position 98 on the further outer side.

The directions of the sense currents of the up-head and down-head in FIGS. 15A to 15C and 16A to 16C for the inner track and outer track can be summarized as shown in FIG. 17. Namely, the directions of the sense currents of the up-head and down-head are opposite in the inner track and outer track. When seeing the inner track and outer track with respect to the up-head, since the shifting directions are different, the directions of the sense currents are opposite. Similarly, with regard to the down-head, although the directions of the sense currents are opposite in the inner track and outer track, in case of the up-head, they are opposite with respect to the inner side and outer side.

Figure 18:
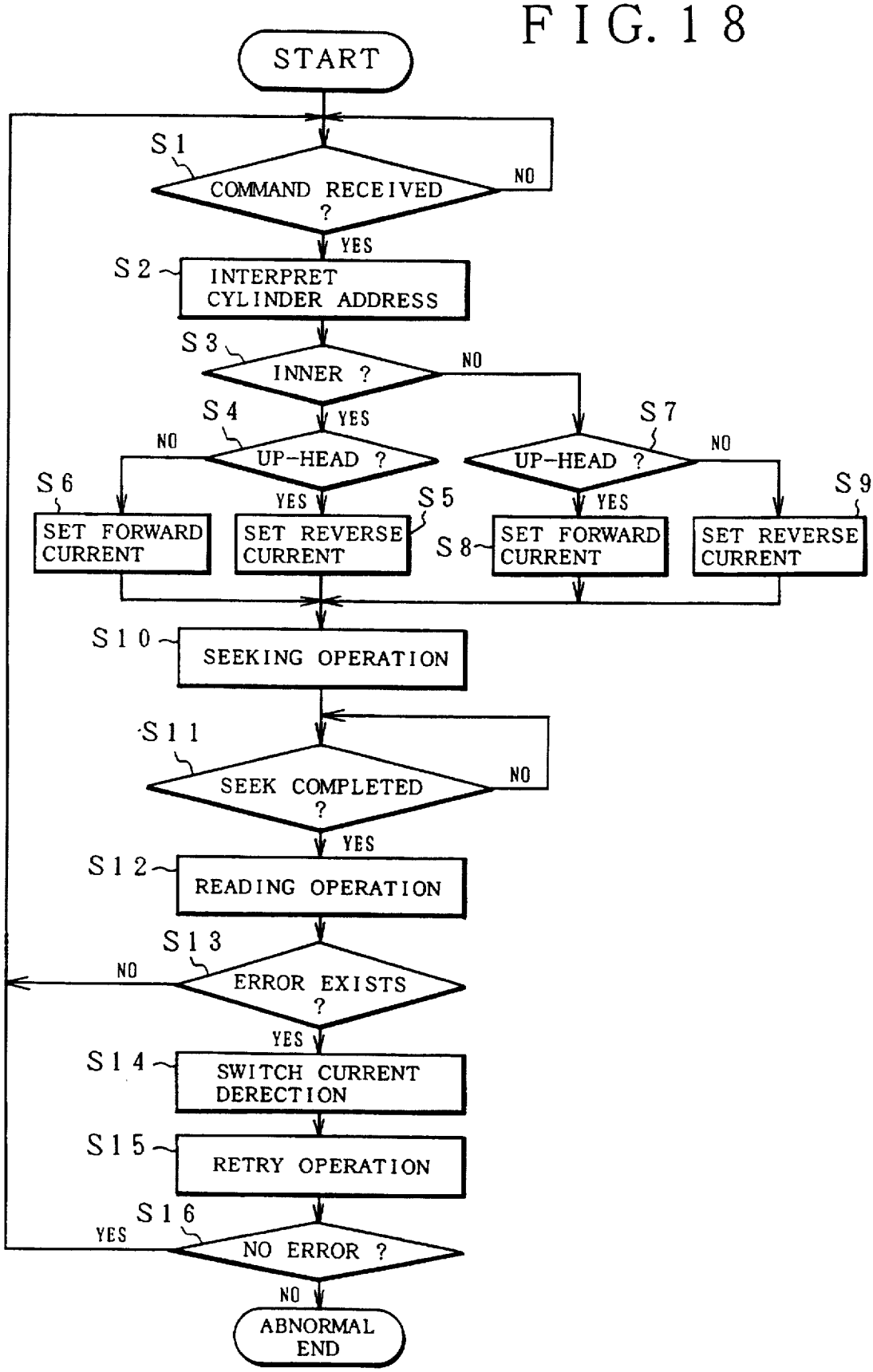
FIG. 18 is a flowchart for a reproducing process of the invention by an MPU in FIG. 6.

FIG. 18 is a flowchart for a reproducing process by the MPU 44 provided for the drive controller 12 in FIG. 6. In step S1, when a read command is received from the upper disk controller, the cylinder address is interpreted in step S2 and a check is made in step S3 to see if it is the inner side or not. The discrimination about the inner side is performed by judging the magnitude relation by using the center cylinder position of all of the cylinders as a reference. When the cylinder position is located on the inner side, step S4 follows and a check is made to see if the selected head is the up-head. Whether the selected head is the up-head or not can be recognized from the head number received by a read command. In case of the up-head, step S5 follows and the reverse direction sense current is set in accordance with FIG. 17. On the other hand, in case of the down-head in step S4, the forward direction sense current is set in step S6. In step S3, when it is judged that the cylinder position is located on the outer side, a check is made in step S7 to see if the selected head is the up-head. In case of the up-head, the forward direction sense current is set on the basis of FIG. 17 in step S8. When it is judged in step S7 that the selected head is the down-head, the reverse direction sense current is set in step S9. When the sense current is supplied to the MR element by setting the direction of the sense current by the processing result in any one of steps S5, S6, S8, and S9, the seeking operation for the target cylinder position is executed in step S10. When the completion of the seeking operation is judged in step S11, the control mode is switched to the on-track control. After that, the reading operation is executed in step S12. With respect to the reading operation, the presence or absence of an error due to the off-track is discriminated in step S13. When the error due to the off-track is discriminated, step S14 follows. The direction of the sense current supplied to the MR element is switched. The retrying operation is executed in step S15. When the error is eliminated in step S16 by the retrying operation, a series of processes are finished. The processing routine advances to step S1 and the apparatus waits for the next command. If the error is not eliminated even after the retrying operation was performed, the processing routine is finished as an abnormality. The number of retrying operation times in step S15 is not set to only one but when the error is not eliminated even after the retrying operation was performed a predetermined plurality of number of times, the processing routine is finished as an abnormality.

According to the invention as mentioned above, by deviating the center position of the reproducing sensitivity by switching the direction of the sense current which is supplied to the MR element, a track positioning precision can be improved and a magnetic disk apparatus of a high reliability can be realized.

Although the above embodiment has been shown and described with respect to the magnetic disk apparatus of the data surface servo system (sector servo system) as an example, the invention can be also applied as it is to a magnetic disk apparatus of the servo surface servo system having an exclusive-use servo surface and servo head. Although the above embodiment has been described with respect to the magnetic disk apparatus, as an example, using the combination heads each integratedly comprising the inductive head (write head) and the MR head (read head), the invention can be also applied to a read only apparatus having only the MR head. In the read only apparatus using only the MR head, if an error occurs in the reading operation, it is sufficient to switch the direction of the sense current and perform the retrying operation for the purpose of an error recovery.

What is claimed is:

1. A magnetic disk apparatus, comprising:

a combination head integratedly having a read head using a magneto-resistive element and a write head using an inductive head;

a positioner for moving said combination head to an arbitrary cylinder position of a recording medium by a rotation of an arm;

a sense current supplying circuit which supplies a predetermined sense current to said magneto-resistive element and can switch a direction of said sense current; and control means for switching the direction of said sense current by said sense current supplying circuit in accordance with the cylinder position of said combination head and magnetically changing a center position of a reproducing sensitivity of said magneto-resistive element in a track width direction;

wherein in the case where the cylinder position of said combination head is located on an inner side in a radial direction of said recording medium, said control means switches the direction of the sense current by said sense current supplying circuit so that the center position of said reproducing sensitivity changes to the inner side for a geometrical center position of said magneto-resistive element, and in the case where the cylinder position is located on an outer side in a radial direction of said recording medium, said control means switches the direction of the sense current by said sense current supplying circuit so that the center position of said reproducing sensitivity changes to the outer side for the geometrical center position of said magneto-resistive element.

2. An apparatus according to claim 1, wherein in said combination head, a geometrical center position of the magneto-resistive element in said read head and a geometrical center position of a recording magnetic pole in said write head are made coincide in the track width direction.

3. An apparatus according to claim 1, wherein said combination head is arranged for each of both medium surfaces of said recording medium.

4. An apparatus according to claim 1, wherein in the case where said combination head is arranged for each of top and bottom surfaces of said recording medium, said control means controls in a manner such that:

in the case where the cylinder position of said combination head is located on the inner side, the direction of the sense current by said sense current supplying circuit provided for every said magneto-resistive element is switched so that both of the center positions of said reproducing sensitivities change to the inner side for the geometrical center position of each of said magneto-resistive elements in said pair of combination heads; and in the case where the cylinder position of said combination head is located on the outer side, the direction of the sense current by said sense current supplying circuit provided for said every magneto-resistive element is switched so that the center position of said reproducing sensitivity changes to the outer side for the geometrical center position of each of said magneto-resistive elements in said pair of combination heads.

5. An apparatus according to claim 4, wherein said control means sets the direction of the sense current which is supplied to the magneto-resistive element of one medium surface of said recording medium and the direction of the sense current which is supplied to the magneto-resistive element of the other medium surface to opposite directions.

6. An apparatus according to claim 1, wherein in said magneto-resistive element, a change amount of the center position in the track width direction of said reproducing sensitivity due to the switching of the sense current lies within a range from 1.0 µm to 2.0 µm for the geometrical center position of said magneto-resistive element.

7. A magnetic disk apparatus comprising:

a read head using a magneto-resistive element;

a positioner for moving said read head to an arbitrary cylinder position of said recording medium;

a sense current supplying circuit which supplies a predetermined sense current to said magneto-resistive element and can switch the direction of said sense current; and control means for switching the direction of said sense current by said sense current supplying circuit in accordance with a cylinder position of said read head, thereby magnetically changing the center position of a reproducing sensitivity of said magneto-resistive element in a track width direction;

wherein in the case where the cylinder position of said combination head is located on an inner side in a radial direction of said recording medium, said control means switches the direction of the sense current by said sense current supplying circuit so that the center position of said reproducing sensitivity changes to the inner side for a geometrical center position of said magneto-resistive element, and in the case where the cylinder position is located on an outer side in a radial direction of said recording medium, said control means switches the direction of the sense current by said sense current supplying circuit so that the center position of said reproducing sensitivity changes to the outer side for the geometrical center position of said magneto-resistive element.

8. An apparatus according to claim 7, wherein in said magneto-resistive element, a change amount of the center position in the track width direction of said reproducing sensitivity due to the switching of the sense current lies within a range from 1.0 µm to 2.0 µm for the geometrical center position of said magneto-resistive element.

9. A reproducing method of a magnetic disk apparatus in which a combination head integratedly having a read head using a magneto-resistive element and a write head using an inductive head is moved to an arbitrary cylinder position of a recording medium by a rotation of an arm, wherein a direction of a sense current which is supplied to said magneto-resistive element of said read head is switched in accordance with the cylinder position of said combination head and a center position of a reproducing sensitivity of said magneto-resistive element is magnetically changed in a track width direction, in the case where the cylinder position of said combination head is located on an inner side in a radial direction of said recording medium, said control means switches the direction of the sense current by said sense current supplying circuit so that the center position of said reproducing sensitivity changes to the inner side for a geometrical center position of said magneto-resistive element, and in the case where the cylinder position is located on an outer side in a radial direction of said recording medium, said control means switches the direction of the sense current by said sense current supplying circuit so that the center position of said reproducing sensitivity changes to the outer side for the geometrical center position of said magneto-resistive element.

10. A method according to claim 9, wherein as said combination head, a combination head in which a geometrical center position of said magneto-resistive element in said read head and a geometrical center position of a recording magnetic pole in said write head are made coincide in the track width direction is used.

11. A method according to claim 9, wherein:

in the case where said combination head is arranged for each of top and bottom surfaces of said recording medium;

when the cylinder position of said combination head is located on the inner side, the direction of the sense current which is supplied to said magneto-resistive element is switched so that the center position of said reproducing sensitivity changes to the inner side for the geometrical center position of each of said magneto-resistive elements in said pair of combination heads; and when the cylinder position of said combination head is located on the outer side, the direction of the sense current which is supplied to said magneto-resistive element is switched so that the center position of said reproducing sensitivity changes to the outer side for the geometrical center position of each of said magneto-resistive elements in said pair of combination heads.

12. A method according to claim 11, wherein the direction of the sense current which is supplied to the magneto-resistive element of one medium surface of said recording medium and the direction of the sense current which is supplied to the magneto-resistive element of the other medium surface are set to opposite directions.

13. A method according to claim 9, wherein when a read error due to an off-track occurs, the direction of the sense current which is supplied to said magneto-resistive element of said read head is switched so that the center position of said reproducing sensitivity is moved in such a direction as to decrease an off-track amount.

14. A magnetic disk apparatus, comprising:

a combination head integratedly having a read head using a magneto-resistive element and a write head using an inductive head;

a positioner for moving said combination head to an arbitrary cylinder position of a recording medium by a rotation of an arm;

a sense current supplying circuit which supplies a predetermined sense current to said magneto-resistive element and can switch a direction of said sense current; and control means for switching the direction of said sense current by said sense current supplying circuit in accordance with the cylinder position of said combination head and magnetically changing a center position of a reproducing sensitivity of said magneto-resistive element in a track width direction;

wherein when a read error due to an off-track occurs, said control means switches the direction of the sense current supplied to said magneto-resistive element so that the center position of said reproducing sensitivity is moved in such a direction as to decrease an off-track amount.

15. A magnetic disk apparatus comprising:

a read head using a magneto-resistive element;

a positioner for moving said read head to an arbitrary cylinder position of said recording medium;

a sense current supplying circuit which supplies a predetermined sense current to said magneto-resistive element and can switch the direction of said sense current; and control means for switching the direction of said sense current by said sense current supplying circuit in accordance with a cylinder position of said read head, thereby magnetically changing the center position of a reproducing sensitivity of said magneto-resistive element in a track width direction;

wherein when a read error due to an off-track occurs, said control means switches the direction of the sense current which is supplied to said magneto-resistive element so that the center position of said reproducing sensitivity is moved in such a direction as to decrease an off-track amount.

16. A reproducing method of a magnetic disk apparatus in which a combination head integratedly having a read head using a magneto-resistive element and a write head using an inductive head is moved to an arbitrary cylinder position of a recording medium by a rotation of an arm, wherein a direction of a sense current which is supplied to said magneto-resistive element of said read head is switched in accordance with the cylinder position of said combination head and a center position of a reproducing sensitivity of said magneto-resistive element is magnetically changed in a track width direction, and when a read error due to an off-track occurs, the direction of the sense current which is supplied to said magneto-resistive element of said read head is switched so that the center position of said reproducing sensitivity is moved in such a direction as to decrease an off-track amount.

17. A reproducing method of a magnetic disk apparatus in which a read head having a magneto-resistive element is moved to an arbitrary cylinder position of a recording medium by rotation of an arm, wherein:

a direction of a sense current supplied to said magneto-resistive element is switched in accordance with a cylinder position of said read head, and a center position of a reproducing sensitivity of said magneto-resistive element is magnetically changed in a track width direction; and when a read error occurs due to an off-tracking of said magneto-resistive element, the direction of the sense current supplied is switched so that the center position of said reproducing sensitivity is moved in a direction reducing the off-tracking amount.

* * * * *